(12) United States Patent
Chien et al.

(10) Patent No.: US 11,169,435 B2
(45) Date of Patent: Nov. 9, 2021

(54) LIGHT SOURCE MODULE AND PROJECTION DEVICE

(71) Applicant: Coretronic Corporation, Hsin-Chu (TW)

(72) Inventors: Chao-Nan Chien, Hsin-Chu (TW); Kuang-Yao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/928,004

(22) Filed: Jul. 14, 2020

(65) Prior Publication Data

US 2021/0018827 A1     Jan. 21, 2021

(30) Foreign Application Priority Data

Jul. 16, 2019   (CN) .......................... 201921108113.8

(51) Int. Cl.
  *G03B 21/20*   (2006.01)
  *G03B 21/00*   (2006.01)
  *H04N 9/79*    (2006.01)

(52) U.S. Cl.
  CPC ....... *G03B 21/2033* (2013.01); *G03B 21/008* (2013.01); *H04N 9/7908* (2013.01)

(58) Field of Classification Search
  CPC . G03B 21/2033; G03B 21/008; H04N 9/7908

USPC .......................................................... 353/85
See application file for complete search history.

(56) References Cited

U.S. PATENT DOCUMENTS

2020/0401027 A1* 12/2020 Zhao ..................... G03B 33/08

FOREIGN PATENT DOCUMENTS

CN          201582585       9/2010

* cited by examiner

*Primary Examiner* — Jerry L Brooks
(74) *Attorney, Agent, or Firm* — JCIPRNET

(57) ABSTRACT

The invention provides a light source module and a projection device. The projection device includes the light source module, an optical engine module, a heat dissipation module, and a projection lens. The light source module includes a light emitting unit, a carrier, and a noise reduction unit. The light emitting unit is configured for providing a lighting beam. The carrier is configured for fixing the light emitting unit and has an opening, and the light source of the light emitting unit is aligned with the opening. The noise reduction unit is configured to surround at least a part of the light emitting unit. The optical engine module includes a light valve located on a transmission path of the lighting beam and is configured for converting the lighting beam into an image beam. The light source module is located between the optical engine module and the heat dissipation module.

20 Claims, 7 Drawing Sheets d1,d2,d3>d4

LIGHT SOURCE MODULE AND PROJECTION DEVICE

CROSS-REFERENCE TO RELATED APPLICATION

This application claims the priority benefit of China application serial no. 201921108113.8, filed on Jul. 16, 2019. The entirety of the above-mentioned patent application is hereby incorporated by reference herein and made a part of this specification.

BACKGROUND OF THE INVENTION

1. Field of the Invention

The invention relates to an image display device and in particular relates to a light source module and a projection device comprising the light source module.

2. Description of Related Art

A projector may adopt a diode light source. R, G and B diodes may be driven to be sequentially turned on or off, and an image may be projected on a projection target such as a screen by a lighting system (for example, all optical elements located in front of a digital micro-mirror device (DMD) along an optical path) and an imaging system (for example, all optical elements located at the DMD and at the rear of the DMD along the optical path). A driving circuit and each diode may generate high-frequency abnormal noise in a process that each diode is turned on or off.

In addition, noise may also be generated when a diode chip (for example, a diode chip located on a metal core printed circuit board (MCPCB)) is driven. The higher a driving current is, the more noise is generated.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a light source module easy to be assembled and it may be used to reduce high-frequency noise effectively.

The invention provides a projection device which may be used to reduce the assembly cost effectively.

In order to achieve one or parts or all of objects or other objects, a light source module in one embodiment of the invention includes a light emitting unit, a carrier and a noise reduction unit. The light emitting unit includes at least one light source and a circuit board, and the light source is disposed on the circuit board and is configured for providing a lighting beam. The carrier is configured for fixing the light emitting unit and has an opening, and the light source of the light emitting unit is aligned with the opening. The noise reduction unit is disposed around at least a part of the light emitting unit.

In order to achieve one or parts or all of objects or other objects, a projection device in one embodiment of the invention includes the light source module, an optical engine module, a heat dissipation module and a projection lens. The light source module includes a light emitting unit, a carrier and a noise reduction unit. The light emitting unit includes at least one light source and a circuit board, and the light source is disposed on the circuit board and is configured for providing a lighting beam. The carrier is configured for fixing the light emitting unit and has an opening, and the light source of the light emitting unit is aligned with the opening. The noise reduction unit is disposed around at least a part of the light emitting unit. The optical engine module includes a light valve which is located on a transmission path of the lighting beam and is configured for converting the lighting beam into an image beam. The light source module is located between the optical engine module and the heat dissipation module. The projection lens is located on a transmission path of the image beam and is configured for projecting the image beam.

Based on the above, in some embodiments of the invention, the noise reduction unit is disposed in the light source module, so that high-frequency noise generated from driving the light emitting unit may be reduced. In some embodiments of the invention, the projection device adopts the light source module, so that the projection device may be favourable in less assembly working and lower cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
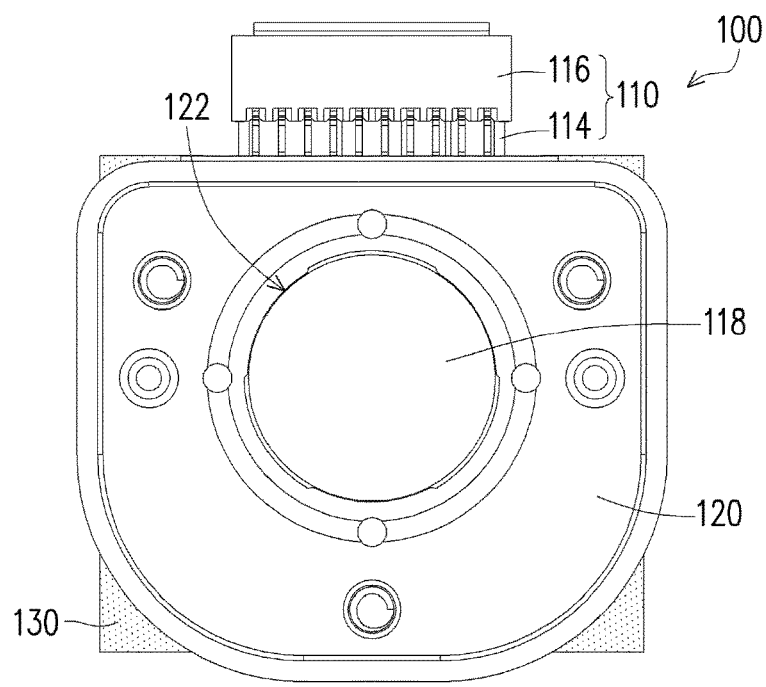
FIG. 1 is a schematic view of a light source module according to the invention.
Figure 2:
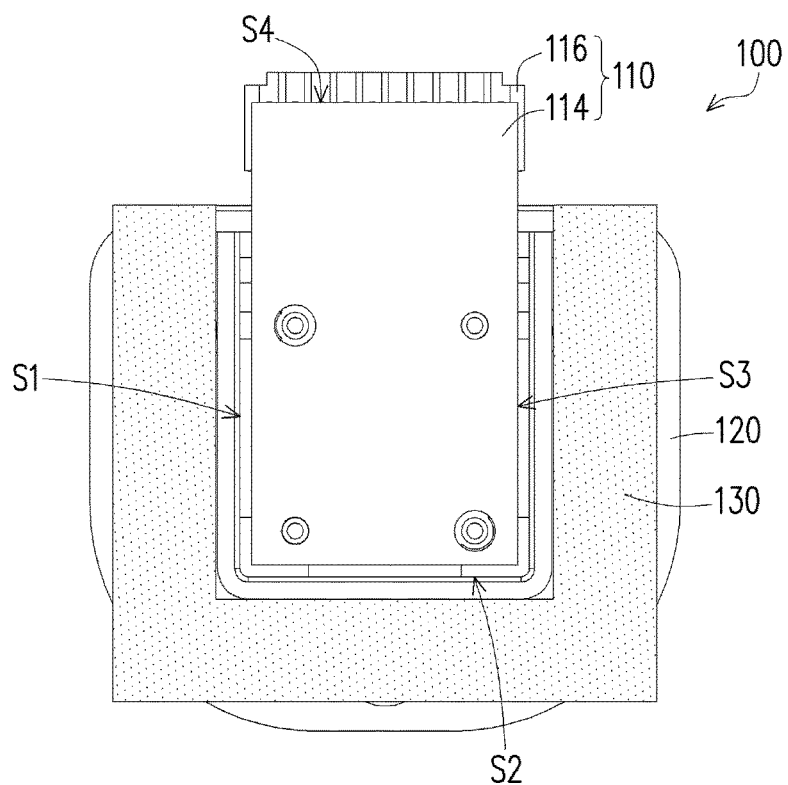
FIG. 2 is a schematic view of the light source module in FIG. 1 from another viewing angle.
Figure 3:
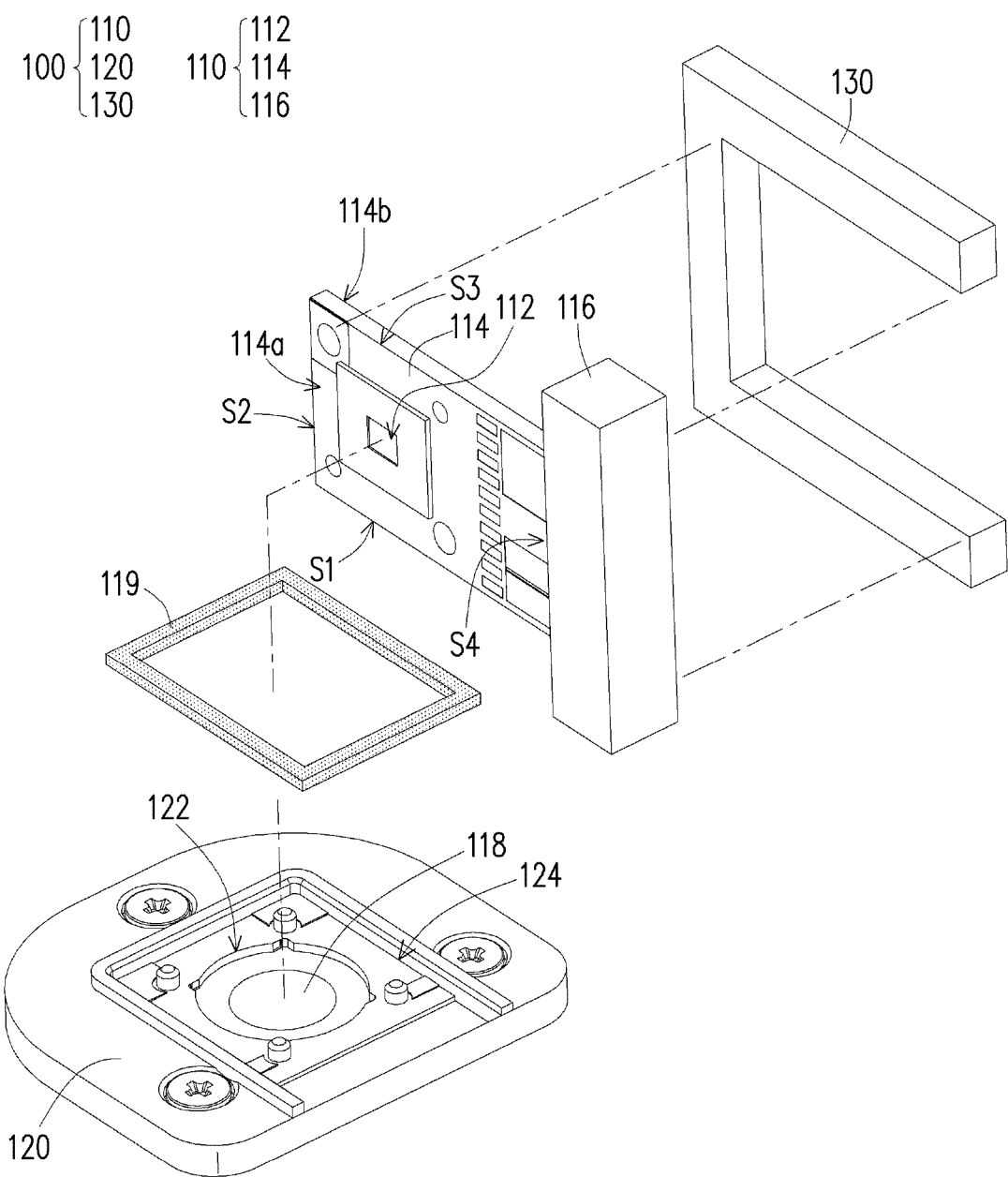
FIG. 3 is an exploded schematic view of the light source module in FIG. 1.

FIG. 1 is a schematic view of a light source module 100 according to one embodiment of the invention. FIG. 2 is a schematic view of the light source module in FIG. 1 from another viewing angle. FIG. 3 is an exploded schematic view of the light source module 100 in FIG. 1. Referring to FIG. 1, FIG. 2 and FIG. 3, the light source module 100 includes a light emitting unit 110, a carrier 120, and a noise reduction unit 130. The light emitting unit 110 includes at least one light source 112 and a circuit board 114, and the light source 112 is disposed on the circuit board 114 and is configured for providing a lighting beam. The carrier 120 is configured for fixing the light emitting unit 110 and has an opening 122, and the light source 112 of the light emitting unit 110 is aligned with the opening 122. The noise reduction unit 130 is disposed around at least a part of the light emitting unit 110.

In some embodiments, the light source 112 may include a light emitting diode or a laser diode which may be selected as required. In detail, a plurality of monochromatic light emitting diodes or laser diodes may be selected. Colors of the monochromatic light emitting diodes or the laser diodes may include red, green and blue. The light emitting diodes or the laser diodes emitting red light, green light or blue light may be disposed on the circuit board 114 as required by a design drawing.

In some embodiments, the circuit board 114 may be a metal core printed circuit board and has a first surface 114a and a second surface 114b which are opposite to each other. The light source 112 is disposed on the first surface 114a, and the first surface 114a faces the carrier 120. In some embodiments, considering that the light source 112 is disposed on the first surface 114a, the first surface 114a may therefore be defined as a light emitting surface, and the second surface 114b may be defined as a non-light emitting surface.

In some embodiments, the light emitting unit 110 further includes a connector 116. The circuit board 114 may have a first side S1, a second side S2, a third side S3, and a fourth side S4, and the connector 116 is disposed at the fourth side S4 of the circuit board 114. The noise reduction unit 130 may be disposed at least along the first side S1, the second side S2, and the third side S3 of the circuit board 114. In another embodiment, the noise reduction unit 130 may also be disposed in a direction surrounding the fourth side S4 of the circuit board 114. In a favourable arrangement, the noise reduction unit 130 may disposed along the four sides S1, S2, S3, and S4 of the circuit board 114, so that a better noise reduction effect may be achieved.

In some embodiments, a material of the noise reduction unit 130 may be a soft material or a compressible material such as sponge, rubber, a silicon sheet, foam or other materials with deformability. For example, the material of the noise reduction unit 130 is preferably a material which is soft while not subject to allow air passing through. The noise reduction unit 130 may be disposed along three sides S1, S2 and S3 or four sides S1, S2, S3 and S4 of the circuit board 114 so as to be presented in annular shape, U-shaped or strip-shaped. In an embodiment that the noise reduction unit 130 is annular, the noise reduction unit 130 may be disposed along the four sides S1, S2, S3 and S4 of the circuit board 114. In an embodiment that the noise reduction unit 130 is U-shaped, the noise reduction unit 130 may be disposed along three sides S1, S2 and S3 of the circuit board 114. In an embodiment that the noise reduction unit 130 is strip-shaped, the noise reduction unit 130 may be bent or spliced to be matched with the outline of the circuit board 114.

Figure 4A:
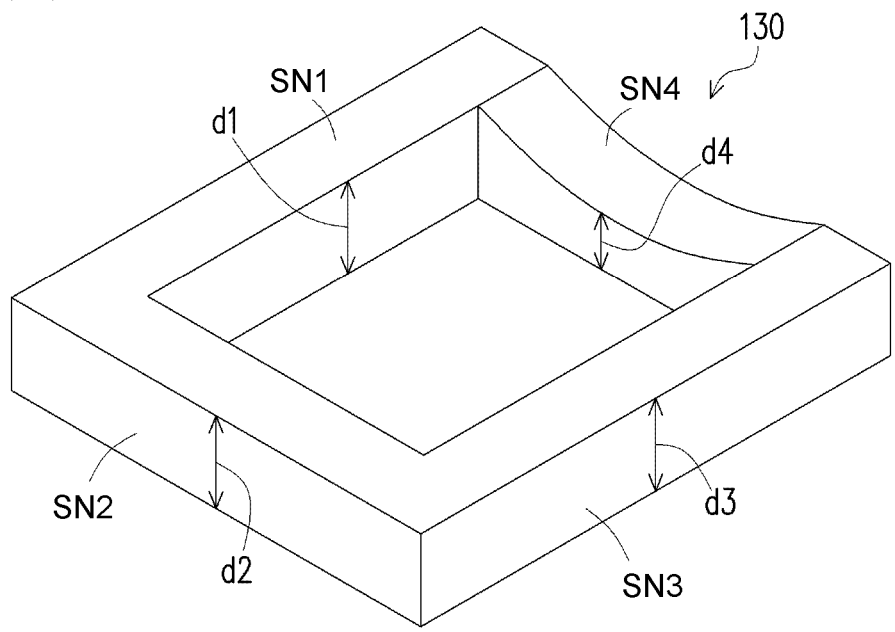
FIG. 4A and FIG. 4B are schematic views illustrating a thickness of the noise reduction unit at the fourth side being less than that at the first side, the second side, or the third side.
Figure 4B:
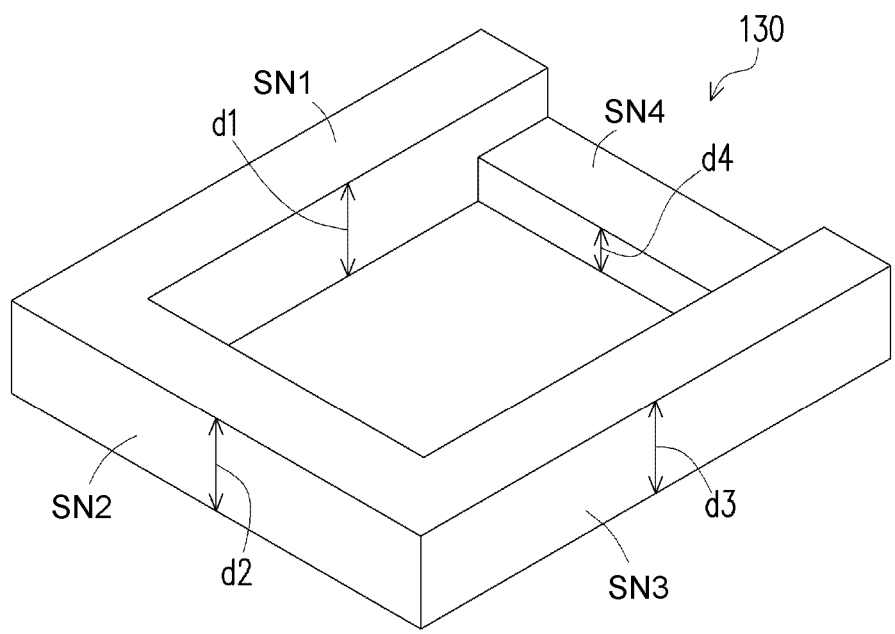

In some embodiments, the noise reduction unit 130 is annular in the embodiments shown in FIG. 4A and FIG. 4B. A thickness of the noise reduction unit 130 at the fourth side SN4 is less than that of the noise reduction unit 130 at the first side SN1, the second side SN2 or the third side SN3 in the embodiment. For illustration only, the thickness of the noise reduction unit 130 may not be drawn in comply with the scale show in FIG. 4A and FIG. 4B. Furthermore, for the purpose of clearness, the thickness of the noise reduction unit 130 may be amplified to be drawn. Referring to FIG. 2, FIG. 3, FIG. 4A and FIG. 4B, the connector 116 is disposed at the fourth side S4 of the circuit board 114, and the noise reduction unit 130 may be located between the circuit board 114 and the carrier 120 at the fourth side S4, so that the noise reduction unit 130 located at the fourth side S4 may have a relatively small thickness. Furthermore, the circuit board 114 is avoided from tipping up from the carrier 120 at the fourth side S4, which may undesirably affect the noise reduction effect. Therefore, in the embodiment, the thickness d4 of the noise reduction unit 130 at the fourth side SN4 is less than the thickness d1, d2 or d3 of the noise reduction unit 130 at the first side SN1, the second side SN2 or the third side SN3. In one embodiment, the thickness d1 of the noise reduction unit 130 may be equal to d2 and d3.

In some embodiments, the light source module 100 further includes a condensing lens 118. The condensing lens 118 is fixed by using the carrier 120 and is exposed from the opening 122 of the carrier 120. In some embodiments, the condensing lens 118 is located on a transmission path of the lighting beam emitted by the light source 112.

In some embodiments, the light source module 100 further includes a buffering washer 119 disposed between the light emitting unit 110 and the carrier 120. The carrier 120 may have a groove 124 for accommodating the buffering washer 119, so that the location of the buffering washer 119 during assembly may be easily defined. In some embodiments, the buffering washer 119 may be made of rubber and may be square, annular or strip-shaped.

In some embodiments, when the light source module 100 is finished assembly, the buffering washer 119 is located in the groove 124 of the carrier 120 and is located between the circuit board 114 and the carrier 120. Further, the circuit board 114 is attached and connected to the carrier 120 so that the first surface 114a of the circuit board 114 faces the carrier 120. Furthermore, the noise reduction unit 130 may be attached to the second surface 114b (non-light emitting surface) of the circuit board 114 and is disposed around at least a part of the light emitting unit 110. In some embodiments, the buffering washer 119 may be clamped between the circuit board 114 and the carrier 120, and the light source 112 may be aligned with the opening 122 of the carrier 120. In some embodiments, before or after the circuit board 114 is attached and connected to the carrier 120, the connector 116 may be attached and connected to the circuit board 114.

As described above, the noise reduction unit 130 encloses at least three sides S1, S2 and S3 of the circuit board 114, and therefore, when the light source module 100 is started, the high-frequency abnormal noise generated from driving the light source 112 by a driving circuit may be substantially absorbed by the noise reduction unit 130.

In the above embodiment, the noise reduction unit 130 is disposed around the circuit board 114 along the side of the circuit board 114, and the noise reduction unit 130 may be disposed on the carrier 120 by way of fitting. In the embodiment, the noise reduction unit 130 may be produced in a size easy to be fitted or take down so as to be convenient for assembly or disassembly.

In the above embodiment, the noise reduction unit 130 is disposed around the side of the circuit board 114, and the light source 112 is aligned with the opening 122, so that the lighting beam emitted by the light source 112 may not be affected or blocked by the noise reduction unit 130.

Figure 5:
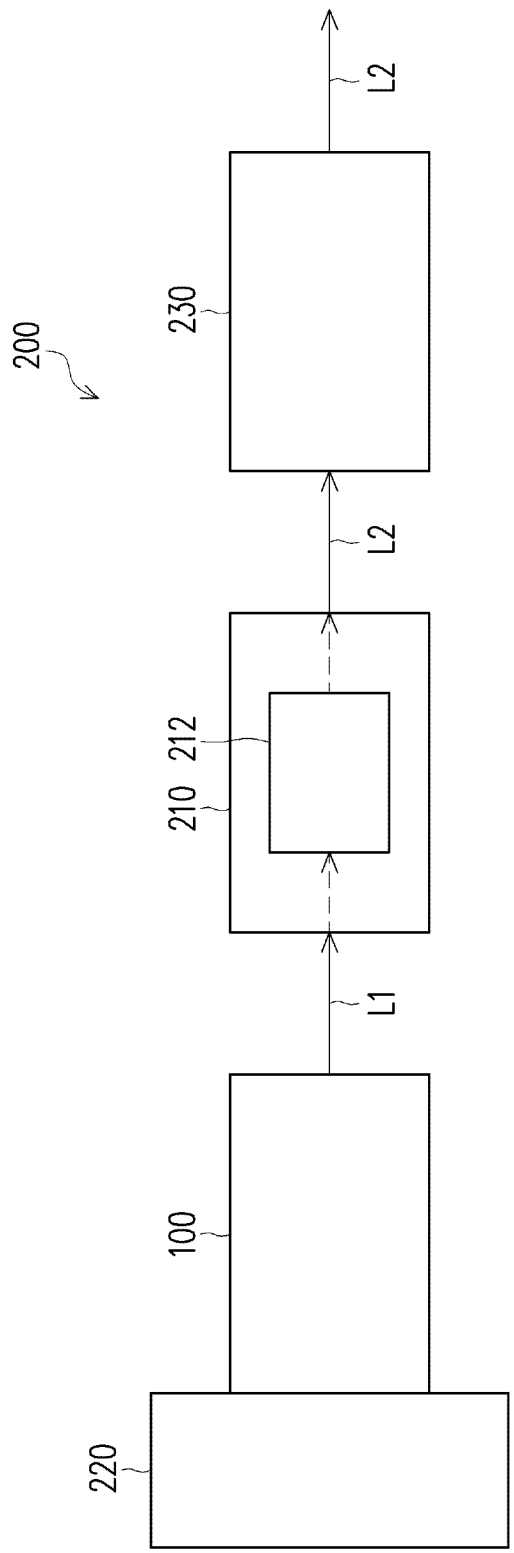
FIG. 5 is a schematic view of a projection device according to the invention.
Figure 6:
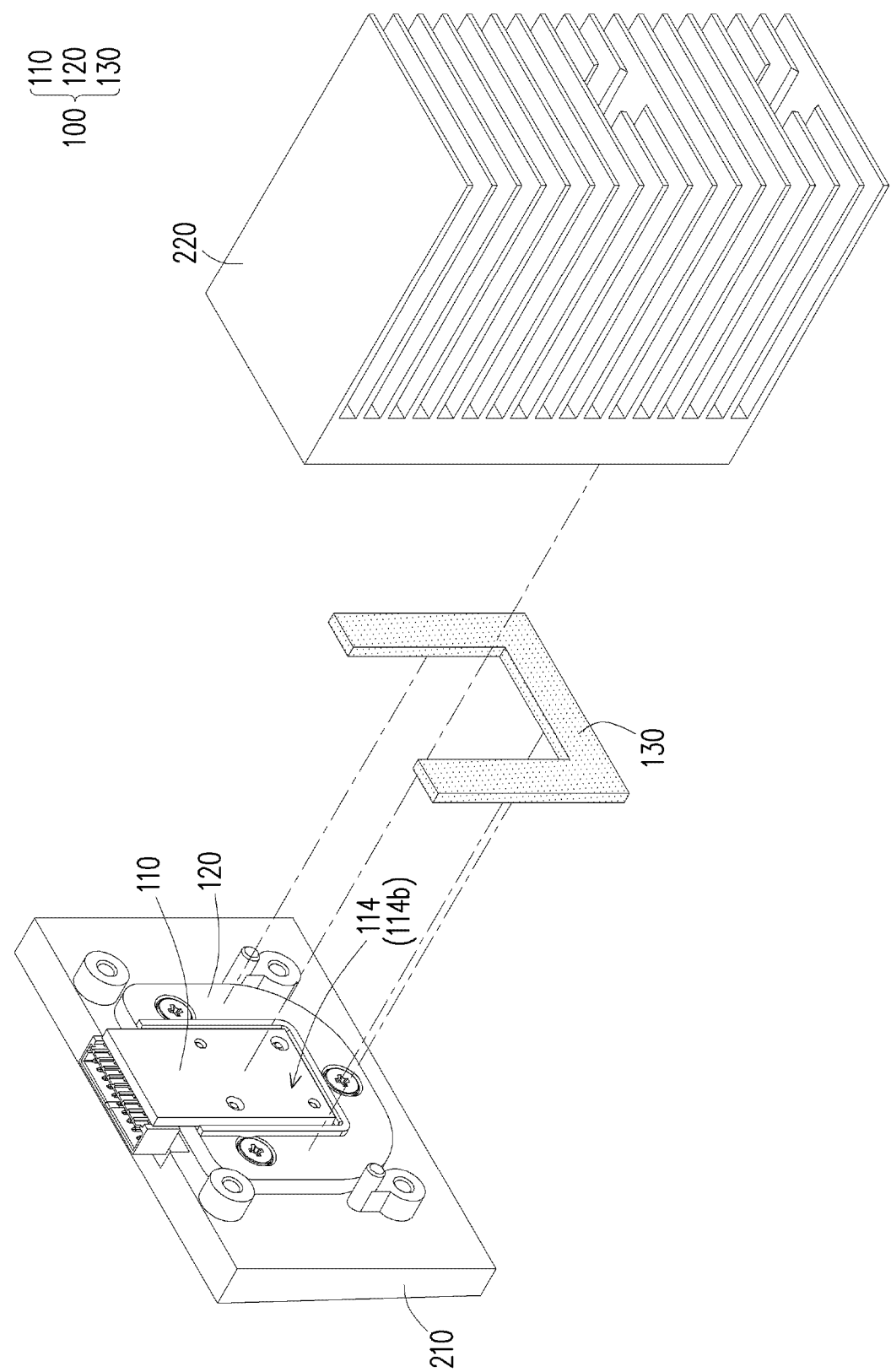
FIG. 6 is a schematic view illustrating the light source module, an optical engine module, and a heat dissipation module being assembled together.

In some embodiments, the light source module 100 may be applied to a projection device 200. FIG. 5 is a schematic view of a projection device 200 provided by the invention. FIG. 6 is a schematic view illustrating the light source module 100, an optical engine module 210, and a heat dissipation module 220 being assembled together. Referring to FIG. 5 and FIG. 6, the projection device 200 includes the light source module 100, the optical engine module 210, the heat dissipation module 220, and a projection lens 230. The light source module 100 is disposed between the optical engine module 210 and the heat dissipation module 220. The carrier 120 of the light source module 100 may be attached and/or connected to the optical engine module 210 by way of screw locking. The light source 112 of the light emitting unit 110 is configured for providing a lighting beam, the optical engine module 210 includes a light valve 212 which is located on a transmission path of the lighting beam L1 so as to convert the lighting beam L1 into an image beam L2. The projection lens 230 is located on a transmission path of the image beam L2 and is configured for projecting the image beam L2.

In some embodiments, specifically, as shown in FIG. 3, FIG. 5 and FIG. 6, the first surface 114a of the circuit board 114 of the light source module 100 faces the optical engine module 210, so that the lighting beam L1 emitted by the light source 112 disposed on the first surface 114a enters the light valve 212 in the optical engine module 210 and is converted into the image beam L2 by the light valve 212. The second surface 114b of the circuit board 114 faces the heat dissipation module 220. In some embodiments, the noise reduction unit 130 disposed on the second surface 114b of the circuit board 114 is located between the heat dissipation module 220 and the carrier 120 of the light source module 100. In other words, the noise reduction unit 130 may be clamped by using the heat dissipation module 220 and the carrier 120. For example, the heat dissipation module 220 may be press-fitted onto the carrier 120 so that the noise reduction unit 130 located between the heat dissipation module 220 and the carrier 120 may be deformed elastically. The press-fitting force of the heat dissipation module 220 to the carrier 120 may be equal to or larger than the force resulted from the deformation of the noise reduction unit 130, so that good sealing and heat radiating effects may be achieved. In the embodiment, the heat dissipation module 220 may include at least one heat radiating fins. However, these descriptions are no limits.

In other embodiments, the heat dissipation module 220 may further include elements such as a heat dissipation plate and/or a heat pipe. In some embodiments, the second surface 114b of the circuit board 114 may be adjacent to the heat dissipation module 220, so that heat generated during the light emitting of the light emitting unit 110 may be rapidly and effectively dissipated through the heat dissipation module 220. Therefore, a relatively higher light emitting efficiency and/or a relatively longer service life may be achieved. For example, the second surface 114b of the circuit board 114 may be coated with a heat dissipation grease, and then, the circuit board 114 coated with the heat dissipation grease may be fitted to the heat dissipation module 220, so that a relatively better heat dissipation effect may achieved. Table 1 is described as an example.

TABLE 1

| Light source module | Sound volume |
| --- | --- |
| Without the noise reduction unit | 29.4 dB(A) |
| With the noise reduction unit disposed | 23.6 dB(A) |

The comparison results of sound volumes obtained without the noise reduction unit and with the noise reduction unit disposed are illustrated in table 1. In the noise measurement process, a microphone may be placed at the same position for two situations in table 1 (without the noise reduction unit and with the noise reduction unit disposed), so that results in table 1 are obtained. From table 1, the noise reduction unit 130 may effectively block the abnormal noise and may achieve a better sound insulation effect. In some embodiments, the noise reduction unit 130 has a particularly obvious effect on absorbing or blocking high-frequency abnormal noise of the frequency ranging from 4K Hz to 8K Hz. In addition, data in table 1 may be measured with the noise reduction unit 130 in FIG. 2 applied. In the embodiment, the noise reduction unit 130 may merely be disposed along the first side S1, the second side S2, and the third side S3 of the circuit board 114. In other embodiments, for example, a favorable noise reduction effect may be provided when the noise reduction unit 130 is disposed along the first side S1, the second side S2, the third side S3, and the fourth side S4 of the circuit board 114.

Figure 7:
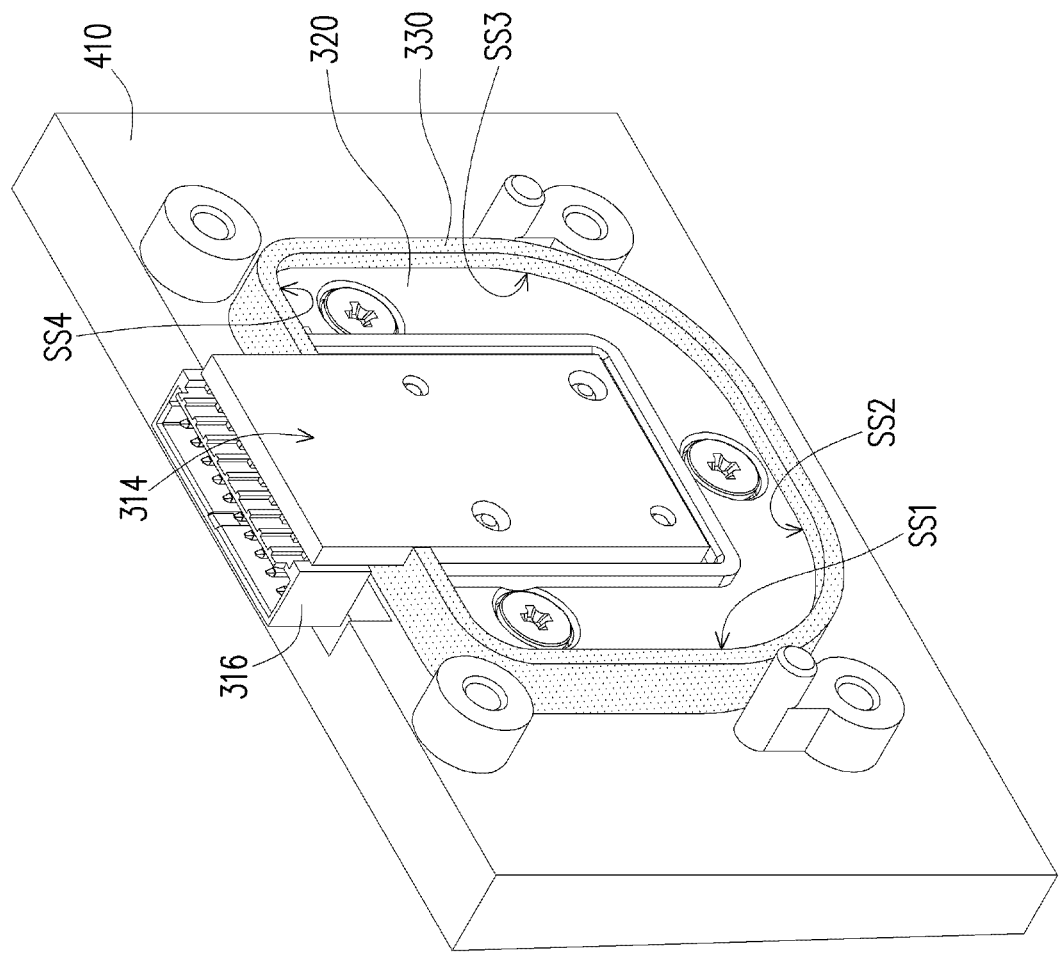
FIG. 7 is a schematic view of a light source module according to another embodiment of the invention.
Figure 8:
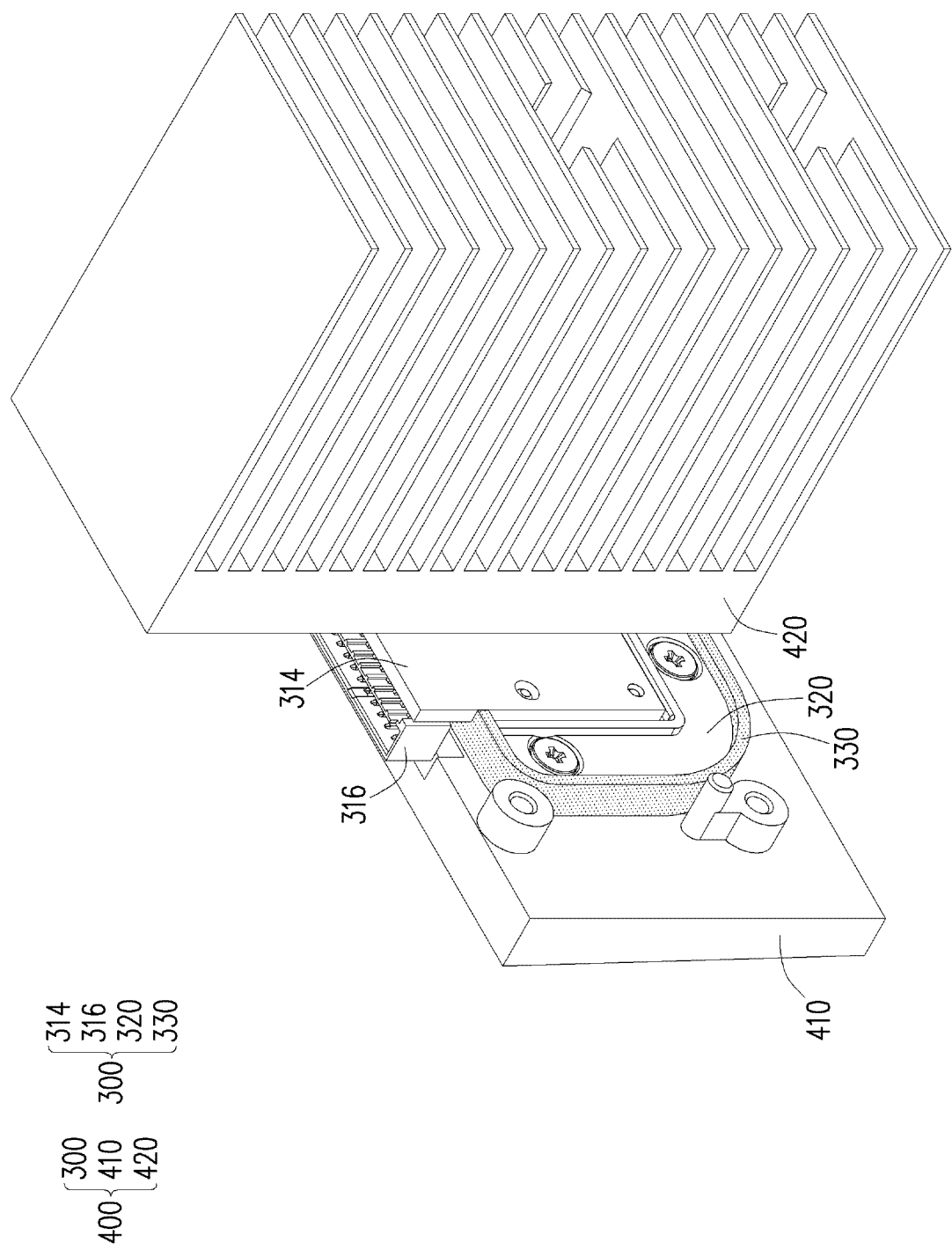
FIG. 8 is an exploded schematic view illustrating the light source module in FIG. 7 being assembled between an optical engine module and a heat dissipation module and being separated from the heat dissipation module.

FIG. 7 is a schematic view of a light source module 300 according to another embodiment of the invention. FIG. 8 is an exploded schematic view illustrating the light source module 300 in FIG. 7 being assembled between an optical engine module 410 and a heat dissipation module 420 and is separated from the heat dissipation module 420. Referring to FIG. 7 and FIG. 8, the embodiments may be similar to the embodiment as shown in FIG. 6, the light source module 300 in the embodiment may also be applied to a projection device 400, and the difference of the embodiment and the embodiment as shown in FIG. 6 lies in that the noise reduction unit 130 may be configured to surround at least a part of the circuit board 114 and may be located between the carrier 120 and the heat dissipation module 220 in the embodiment as shown in FIG. 6. In the embodiment as shown in FIG. 7 and FIG. 8, the noise reduction unit 330 is configured to surround at least a part of the carrier 320. In such a configuration, the noise reduction unit 330 is located between the heat dissipation module 420 and the optical engine module 410. In other words, the noise reduction unit 330 may be clamped by using the heat dissipation module 420 and the optical engine module 410.

Similar to the first side S1, the second side S2, the third side S3 and the fourth side S4 of the circuit board 114, the carrier 320 may have a first side SS1, a second side SS2, a third side SS3, and a fourth side SS4, and the connector 316 may be disposed at the fourth side SS4 of the carrier 320. In some embodiments, the noise reduction unit 330 may be disposed along the first side SS1, the second side SS2 and the third side SS3 of the carrier 320. In a further embodiment, the noise reduction unit 330 may also be disposed along the fourth side SS4 of the carrier 320. In the embodiment, the noise reduction unit 330 may be annular so as to be sleeved onto the sides SS1, SS2, SS3 and SS4 of the carrier 320. Compared with the thickness at the first side SS1, the second side SS2 and the third side SS3, the thickness of the noise reduction unit 330 at the fourth side SS4 may be less so that the circuit 314 and/or the connector 316 may be accommodated. In other embodiments, the noise reduction unit 330 may be U-shaped or strip-shaped so as to be bent to surround at least a part of the carrier 320 along the sides SS1, SS2, SS3 and SS4 of the carrier 320. In other embodiments, the shape of the noise reduction unit 330 may be designed as required by actual demands, and the noise reduction unit 330 may also be fixedly disposed on the carrier 320 by way of bonding In some embodiments, the assembly ways and arrangement positions of elements including the circuit board 314, the connector 316, the condensing lens (not shown in FIG. 7 or FIG. 8) and the buffering washer (not shown in FIG. 7 or FIG. 8) have been disclosed in the embodiment as shown in the above FIG. 6, and therefore, the descriptions thereof may be omitted in the embodiment.

In the embodiments of the invention, the noise reduction unit is disposed in the light source module to enclose at least three sides of the circuit board. Accordingly, the high-frequency abnormal noise generated from driving the light source of the light source module may be absorbed by the noise reduction unit, so that the abnormal noise may be effectively reduced.

In the embodiments of the invention, the noise reduction unit may be produced in a size easy to be fitted or take down so as to be convenient for assembly or disassembly.

In the embodiments of the invention, the noise reduction unit may be configured to surround a periphery of the circuit board or a periphery of the carrier, so that the lighting beam emitted by the light source may not be affected or blocked by the noise reduction unit.

In the embodiments of the invention, the light source module may be attached and/or connected to the heat dissipation module, so that heat generated during the light emitting of the light emitting unit may be rapidly and effectively dissipated through the heat dissipation module. Furthermore, a relatively higher light emitting efficiency and/or a relatively longer service life may be achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, wherein the light source module comprises a light emitting unit, a carrier and a noise reduction unit, wherein the light emitting unit comprises at least one light source and a circuit board, the at least one light source is disposed on the circuit board and is configured for providing a lighting beam, wherein the circuit board has a first surface and a second surface which are opposite to each other, the at least one light source is disposed on the first surface, the first surface faces the carrier, and a light emission direction of the at least one light source is a direction from the second surface to the first surface;

the carrier is configured for fixing the light emitting unit and the carrier has an opening, and the at least one light source of the light emitting unit is aligned with the opening; and the noise reduction unit is configured to be attached to the second surface of the circuit board, or the noise reduction unit comprises a first side, a second side and a third side, and the circuit board is disposed in an area surrounded by the first side, the second side and the third side of the noise reduction unit.

2. The light source module according to claim 1, wherein the at least one light source comprises a light emitting diode or a laser diode.

3. The light source module according to claim 1, wherein the light emitting unit further comprises a connector, and the circuit board further comprises a first side, a second side, a third side, and a fourth side, wherein the connector is disposed at the fourth side of the circuit board.

4. The light source module according to claim 3, wherein the noise reduction unit is disposed along at least three of the first side, the second side, the third side, and the fourth side of the circuit board.

5. The light source module according to claim 4, wherein a thickness of the noise reduction unit at the fourth side is less than that of the noise reduction unit at the first side, the second side, or the third side.

6. The light source module according to claim 1, wherein the noise reduction unit is configured to surround a periphery of the carrier.

7. The light source module according to claim 1, wherein a material of the noise reduction unit comprises sponge, rubber, a silicon sheet, foam, and other soft materials or compressible materials.

8. The light source module according to claim 1, wherein the light source module further comprises a condensing lens, the condensing lens is fixed by using the carrier, and the condensing lens is located on a transmission path of the lighting beam, wherein the condensing lens is exposed from the opening.

9. The light source module according to claim 1, wherein the light source module further comprises a buffering washer disposed between the light emitting unit and the carrier.

10. The light source module according to claim 9, wherein the carrier comprises a groove for accommodating the buffering washer.

11. A projection device, wherein the projection device comprises a light source module, an optical engine module, a heat dissipation module, and a projection lens, wherein
the light source module comprises a light emitting unit, a carrier, and a noise reduction unit, wherein
the light emitting unit comprises at least one light source and a circuit board, the at least one light source is disposed on the circuit board and the at least one light source is configured for providing a lighting beam, wherein the circuit board has a first surface and a second surface which are opposite to each other, the at least one light source is disposed on the first surface, the first surface faces the carrier, and a light emission direction of the at least one light source is a direction from the second surface to the first surface;
the carrier is configured for fixing the light emitting unit and the carrier has an opening, and the at least one light source of the light emitting unit is aligned with the opening; and
the noise reduction unit is configured to be attached to the second surface of the circuit board, or the noise reduction unit comprises a first side, a second side and a third side, and the circuit board is disposed in an area surrounded by the first side, the second side and the third side of the noise reduction unit;
the optical engine module comprises a light valve, the light valve is located on a transmission path of the lighting beam and is configured for converting the lighting beam into an image beam;
the light source module is located between the optical engine module and the heat dissipation module; and
the projection lens is located on a transmission path of the image beam and is configured for projecting the image beam.

12. The projection device according to claim 11, wherein the at least one light source comprises a light emitting diode or a laser diode.

13. The projection device according to claim 11, wherein the light emitting unit further comprises a connector, and the circuit board further comprises a first side, a second side, a third side, and a fourth side, wherein the connector is disposed at the fourth side of the circuit board.

14. The projection device according to claim 13, wherein the noise reduction unit is disposed along at least three of the first side, the second side, the third side, and the fourth side of the circuit board.

15. The projection device according to claim 14, wherein a thickness of the noise reduction unit at the fourth side is less than that of the noise reduction unit at the first side, the second side, or the third side.

16. The projection device according to claim 11, wherein the noise reduction unit is configured to surround the carrier.

17. The projection device according to claim 11, wherein a material of the noise reduction unit comprises sponge, rubber, a silicon sheet, foam, and other soft materials or compressible materials.

18. The projection device according to claim 11, wherein the projection device further comprises a condensing lens, and the condensing lens is fixed by using the carrier and is located on a transmission path of the lighting beam, wherein the condensing lens is exposed from the opening.

19. The projection device according to claim 11, wherein the noise reduction unit is disposed between the heat dissipation module and the optical engine module.

20. The projection device according to claim 19, wherein the noise reduction unit is disposed between the heat dissipation module and the carrier of the light source module.

* * * * *